United States Patent [19]

Yamawaki et al.

[11] Patent Number: 5,743,350
[45] Date of Patent: Apr. 28, 1998

US005743350A

[54] ELECTRIC POWER STEERING APPARATUS

[75] Inventors: Shigeru Yamawaki; Yasuo Shimizu; Katsuji Watanabe, all of Wako, Japan

[73] Assignee: Honda Giken Kogyo Kabushiki Kaisha, Tokyo, Japan

[21] Appl. No.: 673,198

[22] Filed: Jun. 27, 1996

[30] Foreign Application Priority Data

Jul. 5, 1995 [JP] Japan .................. 7-170051

[51] Int. Cl.$^6$ .................. B62D 5/04
[52] U.S. Cl. .................. 180/444; 192/38
[58] Field of Search .................. 180/443, 444; 192/38, 44, 45

[56] References Cited

U.S. PATENT DOCUMENTS

| | | | |
|---|---|---|---|
| 4,852,707 | 8/1989 | Ito et al. | 180/444 |
| 4,884,478 | 12/1989 | Lieser | 192/44 |
| 5,579,879 | 12/1996 | Hasegawa | 192/45 |

FOREIGN PATENT DOCUMENTS 1-69829 A  3/1989  Japan.

*Primary Examiner*—Ed L. Swinehart
*Attorney, Agent, or Firm*—Merchant, Gould, Smith, Edell, Welter & Schmidt, P.A.

[57] ABSTRACT

An electric power steering apparatus transmits an auxiliary torque from an electric motor to a steering system via a mechanical clutch composed of a plurality of sets of friction clutch mechanisms. At least one of the plural clutch mechanism sets is disengageable in advance to the remaining clutch mechanism set. This means that only a part of the clutch mechanisms can be brought to the disengaged state at an advanced timing. When the selected part of the clutch mechanisms is disengaged, the remaining clutch mechanisms are subjected to an unbalanced force tending to disengage the remaining clutch mechanisms. By the effect of the unbalance force, frictional forces acting in the remaining clutch mechanisms are considerably reduced, so that the remaining clutch mechanisms can be disengaged by a small clutch-disengaging force. Thus, the mechanical clutch as a whole can be disengaged by a smaller manual effort or force than as required when all the clutch mechanisms are disengaged at one time.

10 Claims, 14 Drawing Sheets

ELECTRIC POWER STEERING APPARATUS

BACKGROUND OF THE INVENTION

1. Field of the Invention

The present invention relates to improvements in an electric power steering apparatus.

2. Description of the Related Art

In recent years, an electric power steering apparatus has been widely used to provide a comfortable steeling touch to the driver by reducing the manual steering effort or force on a steering wheel. The electric power steering apparatus of the type concerned is constructed such that an auxiliary torque generated by an electric motor in proportion to the steering torque is transmitted via a mechanical clutch to the steering system. One example of such electric power steering apparatus is disclosed in Japanese Patent Laid-Open Publication No. SHO 64-69829, entitled "Clutch Device". The disclosed clutch device is comprised, as shown here in FIGS. 18 and 19, of a clutch device 100 composed of a plurality of friction clutch mechanisms disposed on the same circle.

These clutch mechanisms include a cylindrical outer member 101 rotatable by motor, a polygonal inner member 102 disposed concentrically in the outer member 101, a pair of wedge-shaped spaces (tapering spaces) 108a and 108b defined between the inside surface of the outer member 101 and the outside surface of the inner member 102, a pair of rollers 104a and 104b disposed in the wedge-shaped spaces 108a, 108b, respectively, a spring 105 acting between the rollers 104a, 104b, and a retainer 103 for positioning the rollers 104a, 104b.

The rollers 104a, 104b selectively engage and disengage the outer member 101 and the inner member 102 (engagement and disengagement of the clutch) in response to axial movement of the retainer 103.

In general, when the steering wheel is turned back toward its original neutral position (to disengage the clutch device 100), the auxiliary torque from the motor is not transmitted to the steering wheel. The clutch device 100 can, therefore, be disengaged by a force which is just greater than the frictional force required to lock up the roller 104a or 104b. It is preferable, however, that the manual effort or force required to disengage the clutch is as small as possible with a view to providing a comfortable steering touch to the driver.

The clutch device 100, from the functional point of view, must be smoothly disengageable even when transmission of the auxiliary torque from the electric motor to the steering system still continues. In this instance, since the rollers 104a, 104b are locked up or engaged, with the auxiliary torque exerted thereon, the frictional force acting on the rollers 104a, 104b exceeds the frictional force acting in the usual condition in which no transmission of the auxiliary torque takes place. Thus, a releasing of the lock-up state of the rollers 104a, 104b requires a great manual effort or force.

SUMMARY OF THE INVENTION

It is accordingly an object of the present invention to provide an electric power steering apparatus including a mechanical clutch which can be smoothly disengaged by a small manual effort or force.

In brief, an electric power steering apparatus of the present invention transmits an auxiliary torque from an electric motor to a steering system via a mechanical clutch composed of a plurality of sets of friction clutch mechanisms. At least one of the plural clutch mechanism sets is disengageable in advance to the remaining clutch mechanism set. This means that only a part of the clutch mechanisms can be brought from the engaged state to the disengaged state at an advanced timing. When the selected part of the clutch mechanisms is disengaged, the remaining clutch mechanisms are subjected to an unbalanced force tending to disengage the remaining clutch mechanisms. By the effect of the unbalanced force, the frictional force acting in the remaining clutch mechanisms is considerably reduced. The remaining clutch mechanisms can now be brought to the disengaged state only by a small manual effort or force. The mechanical clutch as a whole can, therefore, be disengaged by a smaller manual effort than as required when all the clutch mechanisms are to be disengaged at one time.

The plurality of sets of friction clutch mechanisms comprise an input member, an output member, a plurality of tapering spaces defined between the input member and the output member, a plurality of locking members movably disposed in the tapering spaces, respectively, for selectively engaging and disengaging the input and output members, a plurality of position control members for positioning the locking members, and a plurality of urging members urging the locking members against the adjacent position control members. With the electric power steering apparatus thus arranged, the locking members selectively engage and disengage the input member and the output member in response to movement of the position control members.

The position control members are disposed on the same circle and circumferentially spaced from one another. In one preferred form, one of the position control members which is associated with said at least one set of clutch mechanisms has a longer circumferential length than the remaining position control member. By virtue of a simple arrangement realized by elongating a part of the position control elements, the clutch mechanisms can be readily brought to the disengaged state.

Said at least one set of clutch mechanisms is disengageable by a smaller clutch-disengaging force than the remaining set of clutch mechanisms. With this arrangement, the engaged state of the mechanical clutch as a whole can be released with a small manual effort or force.

The tapering spaces associated with said at least one set of clutch mechanisms preferably have a greater taper angle than the tapering spaces of the remaining set of clutch mechanisms. The manual effort or force required to disengage the clutch mechanisms can be reduced merely by enlarging the taper angle of a part of the tapering spaces.

In another preferred form, the locking members of said at least one set of clutch mechanisms have a smaller diameter than the locking members of the remaining set of clutch mechanisms. Thus, a considerable reduction in clutch-disengaging force can be obtained merely by decreasing the diameter of a part of the locking members.

The locking members of said at least one set of clutch mechanisms preferably have respective contact surfaces having a smaller frictional resistance than contact surfaces of the respective locking members of the remaining set of clutch mechanisms. As an alternative, portions of said at least one set of clutch mechanisms which are engageable with the mating locking members have respective contact surfaces having a smaller frictional resistance than contact surfaces engageable with the respective locking members of the remaining set of clutch mechanisms. This arrangement facilitates a smooth releasing of the engaged state of the clutch mechanisms.

According to a preferred form of the invention, the locking members of said at least one set of clutch mechanisms have a smaller diameter than the locking members of the remaining set of clutch mechanisms, and the tapering spaces and the position control members each have the same shape. With this arrangement, while the clutch is in the engaged state, the small-diameter locking members are able to approach the tapering circumferential ends of the mating tapering spaces more closely than the remaining locking members. Thus, in response to the movement of the position control members, the small-diameter locking members can be unlocked in advance to the remaining locking members. When a part of the clutch mechanisms is brought to the disengaged state, the remaining clutch mechanisms are subjected to an unbalanced load or force tending to disengage the remaining clutch mechanisms. By the action of the unbalanced force, the frictional force acting in each of the remaining clutch mechanisms is considerably reduced with the result that the remaining clutch mechanisms can be disengaged by a small manual clutch-disengaging effort or force.

In another preferred form of the present invention, the tapering spaces of said at least one set of clutch mechanisms have a greater taper angle than the tapering spaces of the remaining set of clutch mechanisms, and the locking members and the position control members each have the same shape. Accordingly, these locking members which are disposed in the tapering spaces of the larger taper angle are able to approach the tapering circumferential ends of the respective tapering spaces more closely than the remaining locking members. Thus, the locking members engaged with the tapering spaces of the large taper angle are released from the engaged state at an advanced timing as compared to the remaining locking members. When a part of the clutch mechanisms is disengaged, the remaining clutch mechanisms are subjected to an unbalanced load or force tending to disengage the remaining clutch mechanisms. By the action of the unbalanced force, the frictional force acting in each of the remaining clutch mechanisms is considerably reduced with the result that the remaining clutch mechanisms can be disengaged by a small manual effort or force. Thus, by using a simple arrangement consisting of enlargement of the taper angle of a part of the tapering spaces, the plural clutch mechanisms can be released at different timings and with a smaller manual effort or force than as required when all the clutch mechanisms are released at one time.

At least one of the position control members may have a different shape than the remaining position control member, and the tapering spaces and the locking members each have the same shape and disposed at regular intervals. With this arrangement, while the locking members are locked up in the tapering spaces, the sum (resultant vector) of vectors acting from the respective locking members to the output member is equal to zero. This means that the output member is free from unbalanced load. Accordingly, the output member and the mechanical clutch as a whole have a high mechanical strength and a good durability.

The above and other object, features and advantages of the present invention will become manifest to those versed in the art upon making reference to the detailed description and accompanying sheets of drawings in which preferred structural embodiments incorporating the principles of the present invention are shown by way of illustrative example.

DETAILED DESCRIPTION OF THE PREFERRED EMBODIMENTS

Certain preferred embodiments of the present invention will be described below in greater detail with reference to the accompanying sheets of drawings.

FIGS. 1 through 11 show a first embodiment of an electric power steering apparatus according to the present invention.

Figure 1:
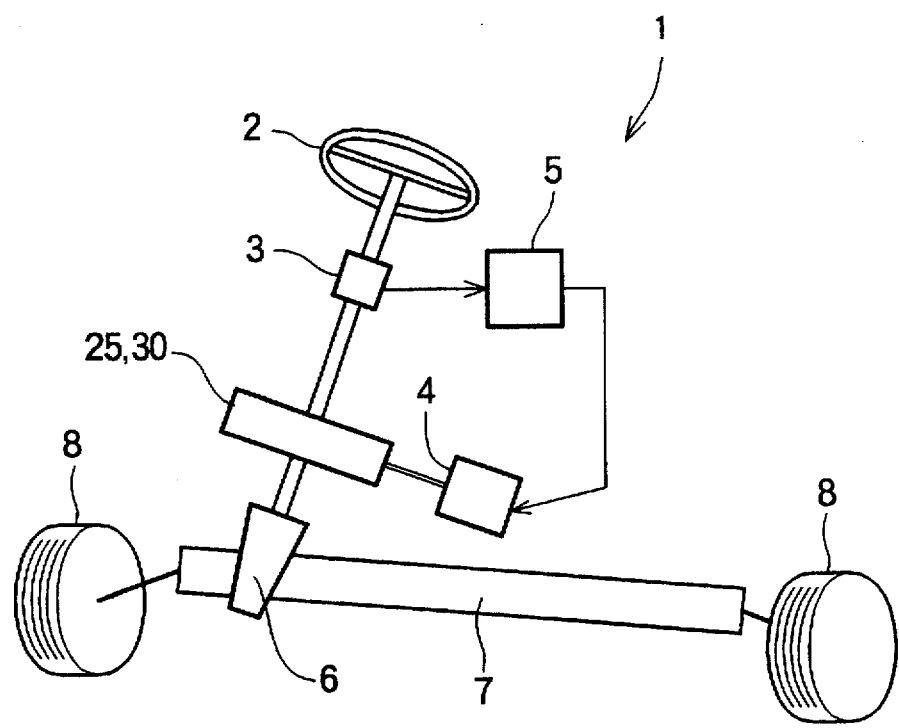
FIG. 1 is a diagrammatical view showing the general construction of a first embodiment of an electric power steering apparatus according to the present invention

As shown in FIG. 1, the electric power steering apparatus 1 includes a steering torque detecting device 3 for detecting a steering torque in a steering system generated upon actuation of a steering wheel 2, an electric motor 4 for exerting an auxiliary torque on the steering system, a control unit or controller 5 for controlling the operation of the electric motor 4, and a torque transmitting unit 25 and a mechanical clutch 30 that selectively transmits the auxiliary torque from the electric motor 4 to the steering system. The electric power steering apparatus 1 thus constructed is operative to steer a pair of wheels 8 and 8 via a pinion 6 and a rack 7.

Figure 2:
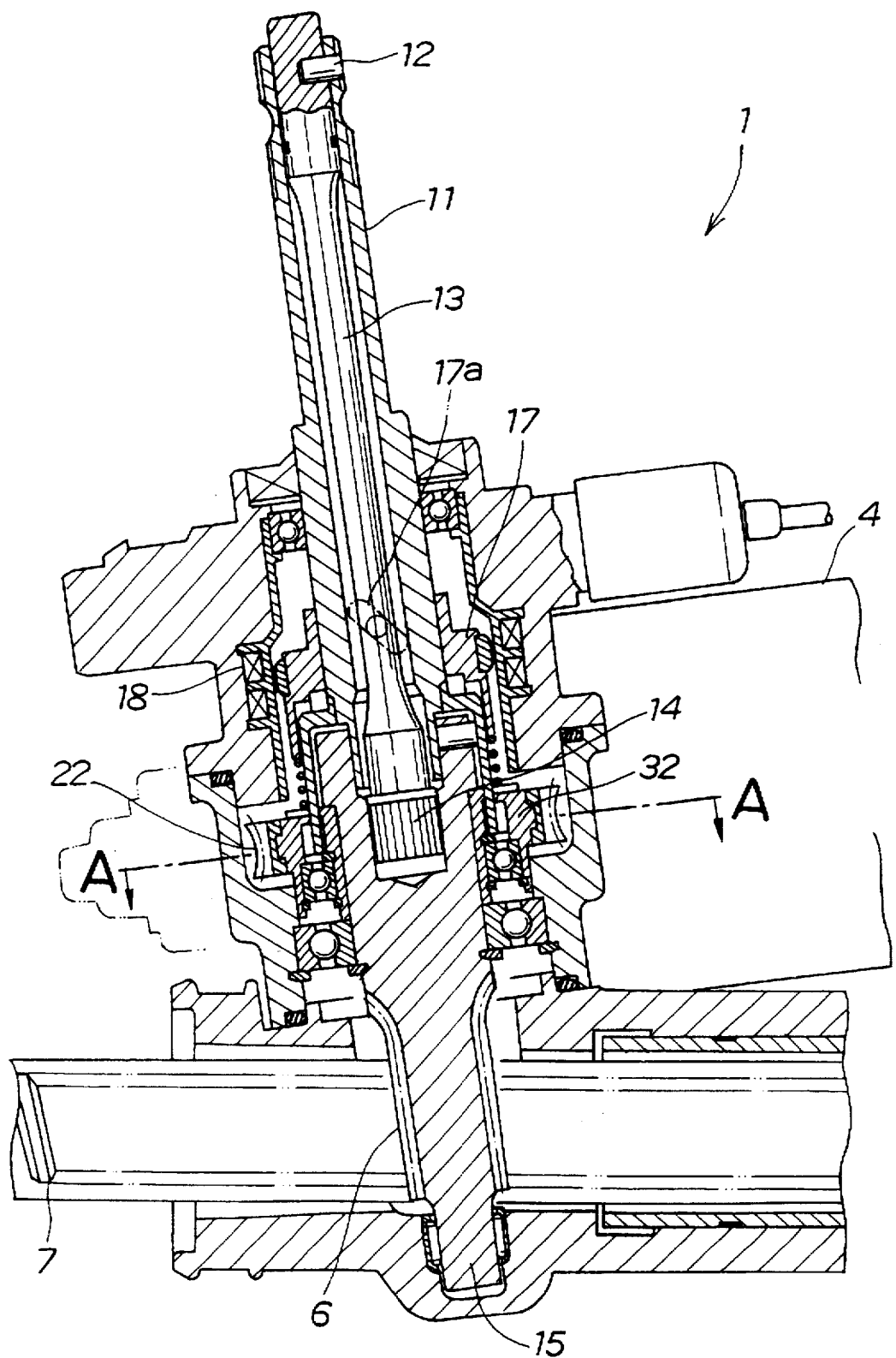
FIG. 2 is a cross-sectional view of an essential part of the electric power steering apparatus.

The steering system includes, as shown in FIG. 2, an input shaft 11 rotatable by the steering wheel 2, a torsion bar 13 connected by a pin 12 to the input shaft 11 and extending in a downward direction, and an output shaft 15 engaged at its upper portion with a spline 14 formed on a lower end of the torsion bar 13, the output shaft 15 having on its lower portion a pinion 6. The torsion bar 13 is a member which is capable of producing a twist angle exactly proportional to the steering torque and which produces a relative torsional displacement between the input shaft 11 and the output shaft 15.

A slider 17 is in the form of a hollow cylinder having in its inside surface a diagonal groove 17a and a non-illustrated elongated straight groove. The slider 17 is connected between the input shaft 11 and the output shaft 15 so that the slider 17 is displaceable in the axial direction according to the relative torsional displacement between the input shaft 11 and the output shaft 15. The amount of axial displacement of the slider 17 is in proportion to the steering torque and, in the illustrated embodiment, it is converted into an electric signal by a variable inductance sensor 18. Thus, the torsion bar 13, the slider 17 and the sensor 18 jointly constitute the aforesaid steering torque detecting device 3. A worm wheel 22 is loosely fitted around the outside surface of an upper portion of the output shaft 15.

Figure 3:
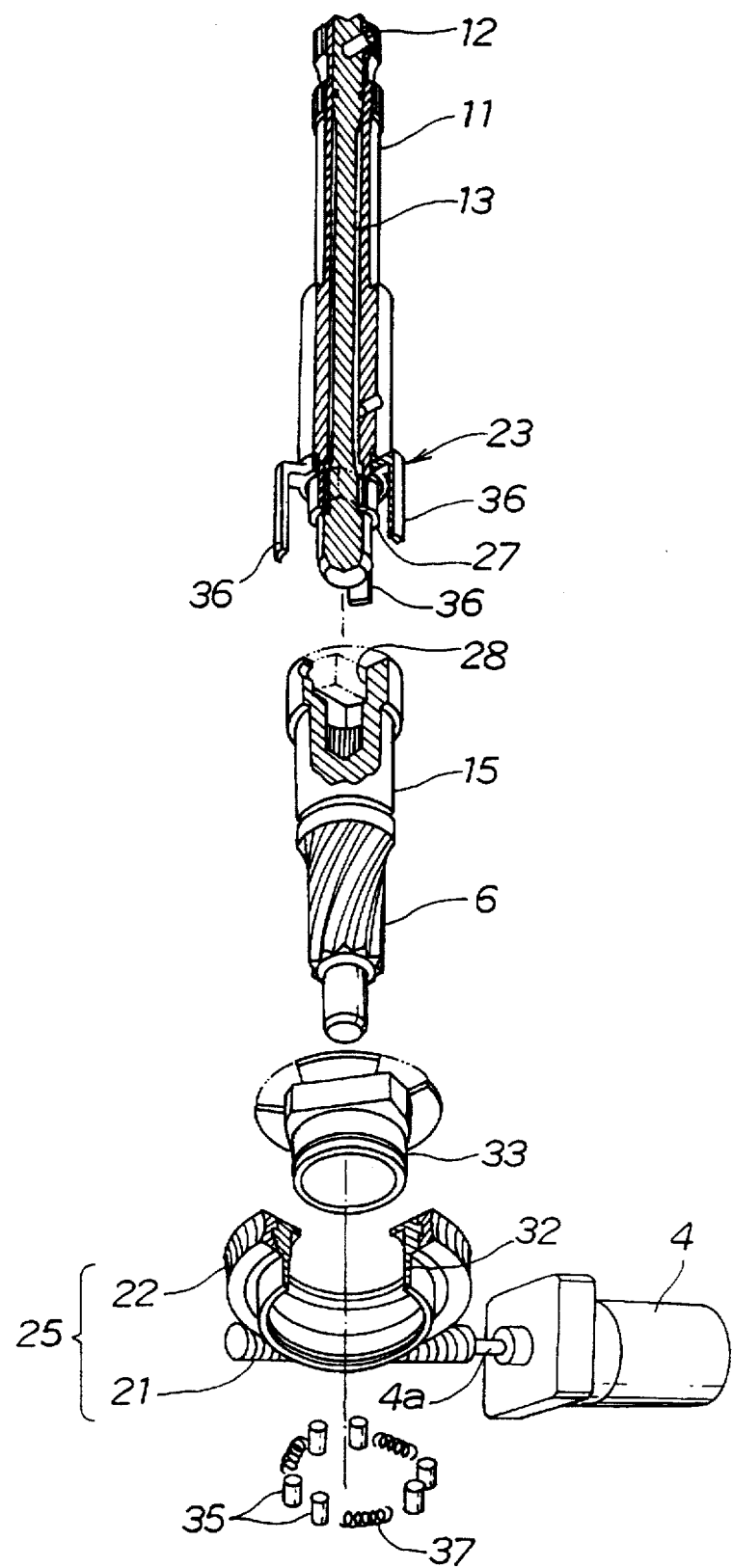
FIG. 3 is an exploded perspective view of a main portion of the electric power steering apparatus.

As shown in FIG. 3, the input shaft 11 is a hollow shaft, and the torsion bar 13 extends through an axial hole in the hollow input shaft 11. The input shaft 11 is provided with an annular position control unit 23 fixedly connected to the outside surface of a lower end portion of the input shaft 11. The output shaft 15 is provided with a tubular output member 33 tightly fitted with the outside surface of an upper portion of the output shaft 15.

The electric motor 4 has an output shaft 4a coupled with a worm 21. The worm 21 is held in mesh with the worm wheel 22. The worm wheel 22 has an annular shape and fixedly connected with a tubular auxiliary torque input member 32 disposed therein.

The worm 21 and the worm wheel 22 jointly constitute the aforesaid torque transmitting unit 25 for the transmission of the auxiliary torque from the electric motor 4 to the steering system.

The rack 7 is driven via the pinion 6 by a combined torque which is equal to the sum of the steering torque in the steering system (input shaft 11→torsion bar 13→output shaft 15).and the auxiliary torque from the electric motor 4.

Figure 4:
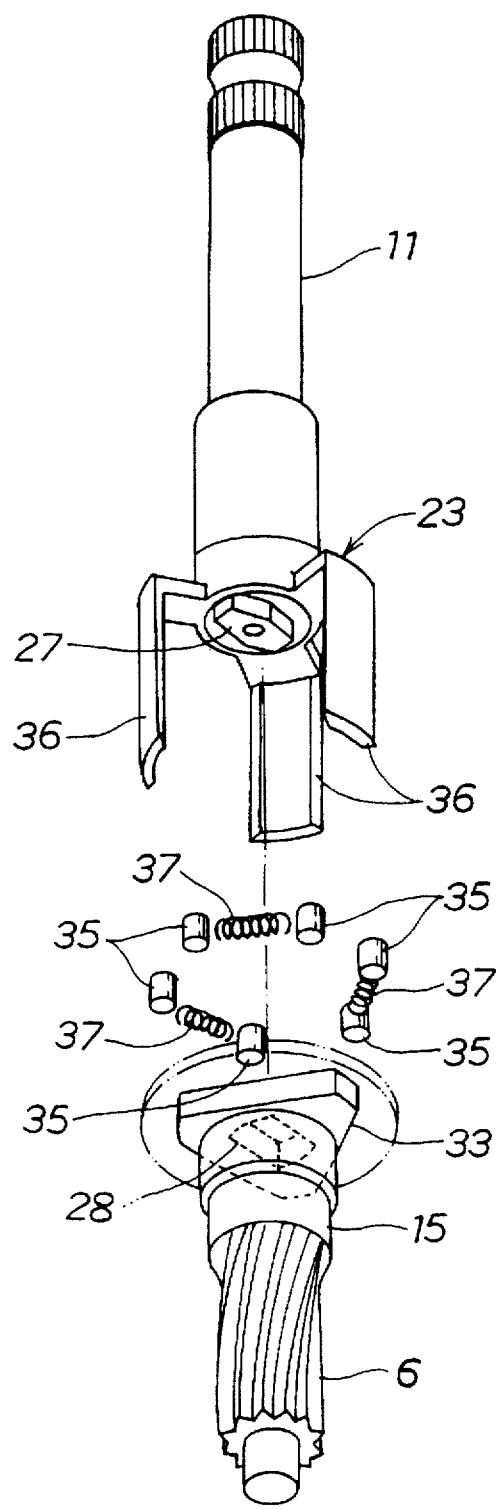
FIG. 4 is an exploded perspective view of an essential part of a mechanical clutch according to the first embodiment.

FIG. 4 shows the mechanical clutch according to the present invention. In FIG. 4, the position control unit 23 is provided with three position control members 36 at a lower end thereof.

The input shaft 11 has a substantially diamond-shaped locking projection 27 disposed on a central portion of its lower end face. The locking projection 27 is engageable with a substantially rectangular locking recess 28 formed in an upper end face of the output shaft 15. The locking projection 27 and the locking recess 28 jointly form a rotation coupling mechanism which defines maximum angular limits of the relative rotational movement between the input shaft 11 and the output shaft 15 when an excessively large torque is generated between these shafts 11 and 15.

Figure 5:
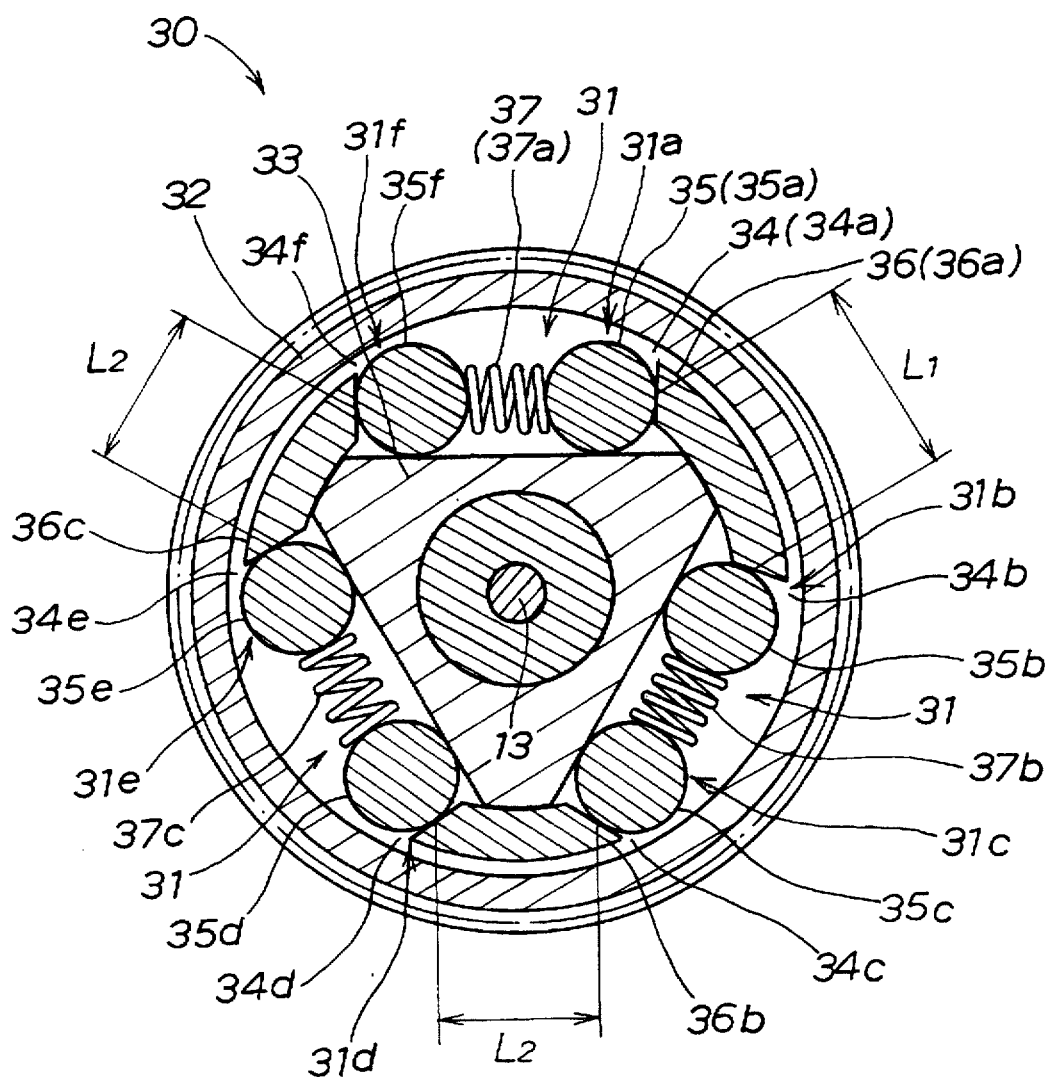
FIG. 5 is an enlarged cross-sectional view taken along line A—A of FIG. 2.

FIG. 5 shows a detailed cross section of the mechanical clutch 30. The mechanical clutch 30 is provided with a plurality (three in the illustrated embodiment) of sets of friction clutch mechanisms 31 disposed on the same circle. The clutch mechanisms 31 are composed of the auxiliary torque input member 32, the output member 33, a plurality of tapering spaces 34 defined between the input and out put members 32, 33, a plurality of locking members 35 disposed in the tapering spaces 34, respectively, the plural (three in the illustrated embodiment) position control members 36 for positioning locking members 35, and a plurality of urging members 37 urging the respective locking members 35 toward the adjacent position control members 36. With the clutch mechanisms 31 thus constructed, the locking members 35 selectively engage and disengage the input member 32 and the output member 33 in response to movement of the position control members 36.

More specifically, there are three pairs of tapering spaces 34 defined between the inside surface of the tubular auxiliary torque input member 33 and the outside surface of a substantially equilateral triangular portion of the output shaft 15 such that the tapering spaces 34 in each pair is associated with one of three sides of the substantially equilateral triangular portion of the output member 33. The tapering spaces 34 each have a tapering circumferential end. The locking members 35 are composed of circular cylindrical rollers movably disposed in the tapering spaces 34, respectively, adjacent to the tapering circumferential ends. The urging members 37 (compression coil springs, for example) are each disposed between two confronting ones of the locking members 35.

The equilateral triangular portion of the output member 33 is truncated at its vertexes and hence has three flat corners. The three position control members 36 are each rotatably disposed in a corresponding one of the three flat corners of the output member 33 and the inside surface of the auxiliary torque input member 32. Each of the position control members 36 circumferentially projects into two adjacent ones of the tapering spaces 34 and held in contact with the locking members 35 received in the respective tapering spaces 34. The position control members 36 are disposed on the same circle and circumferentially spaced at equal intervals.

For further description, the plural clutch mechanisms 31 are identified as a first clutch mechanism 31a, a second clutch mechanism 31b, a third clutch mechanism 31c, a fourth clutch mechanism 31d, a fifth clutch mechanism 31e, and a sixth clutch mechanism 31f, respectively. Similarly, the plural tapering spaces 34 are identified as a first tapering space 34a, a second tapering space 34b, a third tapering space 34c, a fourth tapering space 34d, a fifth tapering space 34e, and a sixth tapering space 34f, respectively. For the same purpose as described above, the plural locking members 35 are identified as a first locking member 35a, a second locking member 35b, a third locking member 35c, a fourth locking member 35d, a fifth locking member 35e, and a sixth locking member 35f, respectively. Likewise, the three position control members 35 are identified as a first position control member 36a, a second position control member 36b, and a third position control member 36c respectively. Similarly, the plural urging members 37 are identified as a first urging member 37a, a second urging member 37b, and a third urging member 37c, respectively.

The mechanical clutch 30 of the foregoing construction operates in such a manner that the first, third and fifth clutch mechanisms 31a, 31c and 31e are brought to the engaged state or condition when they are rotated in the direction of forward rotation (clockwise direction in FIG. 5) of the auxiliary torque input member 32, while the second, fourth and sixth clutch mechanisms 31b, 31d and 31f are brought to the engaged state when they are rotated in the direction of forward rotation (counterclockwise direction in FIG. 5) of the auxiliary torque input member 32.

In the mechanical clutch 30 of the present invention, the first and second clutch mechanisms 31a and 31b incorporated in two adjacent sets of the clutch mechanisms 31 are brought to the disengaged state or condition in advance to the remaining clutch mechanisms 31c, 31d, 31e and 31f. In the plurality of sets of clutch mechanisms 31, the tapering spaces 34 and the locking members 35 each have the same configuration and disposed equidistantly. The respective locking members 35a, 35b of the first and second clutch mechanisms 31a, 31b are positioned by the first position control member 36a. The first position control member 36a has a circumferential length $L_1$ greater than (i.e., different from) the circumferential length $L_2$ of the other position control members 36b, 36c.

Operation of the mechanical clutch 30 of the foregoing construction will be further described below with reference to FIGS. 6 through 11.

Figure 6:
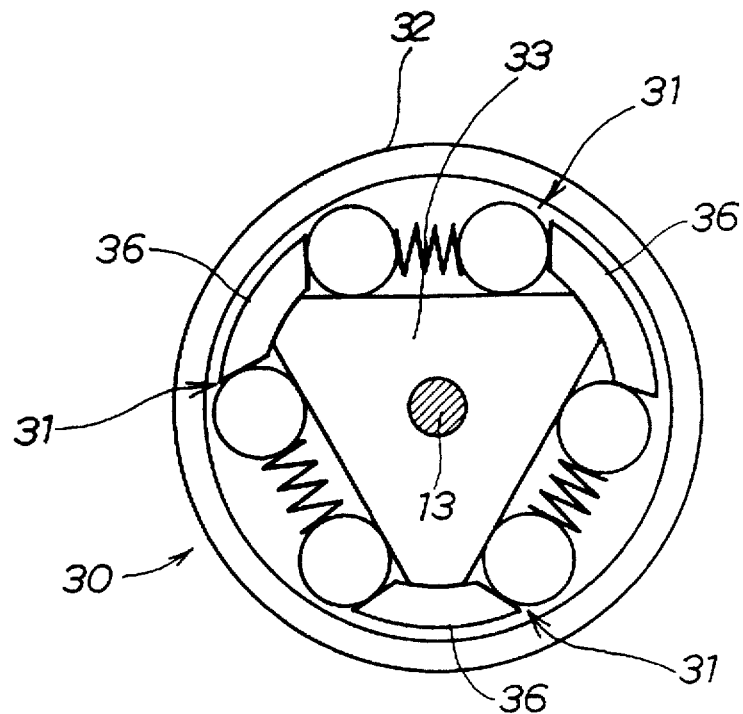
FIG. 6 is a diagrammatical view illustrative of the operation of the mechanical clutch shown in FIG. 5, the view showing the condition in which clutch in its disengaged state

When the steering wheel 2 (FIG. 1) is not actuated, no signal is generated from the steering torque detecting means 3 and, hence, no assist command signal is output from the control unit 5. Accordingly, the electric motor 4 is kept in the stationary or halted state. Thus, all the clutch mechanisms 31 are in the disengaged state, as shown in FIG. 6.

Figure 7:
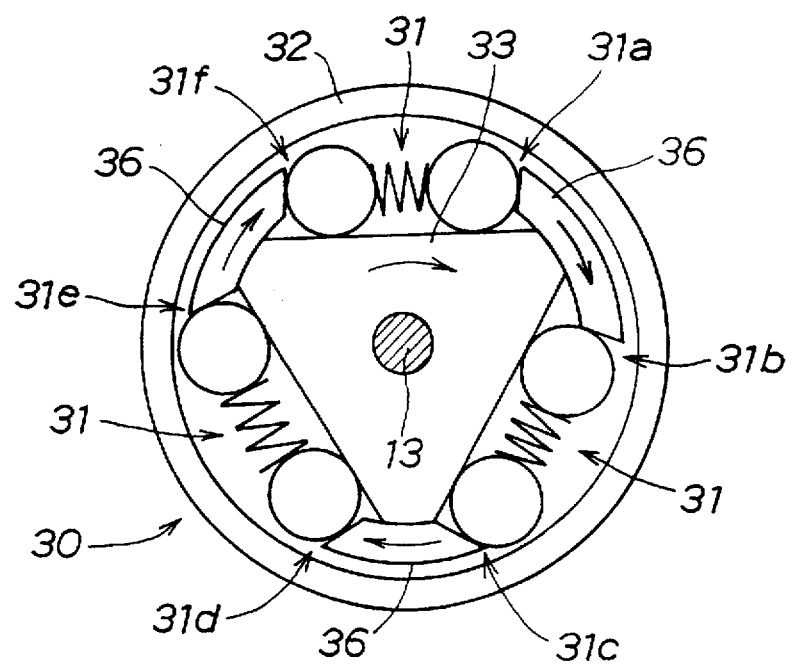
FIG. 7 is a diagrammatical view illustrative of the operation of the mechanical clutch in the first embodiment, the view showing the condition in which the clutch is subjected to a small steering torque.

From this condition, when the steering wheel 2 (FIG. 1) is steered in one direction (clockwise direction in FIG. 6) with a light manual steering effort or force (i.e., the steering torque is small) as experienced when the surface load is small (i.e., low friction surface), for example, no substantial change is observed in the relative position or phase between the position control members 36 of the input shaft 11 and the output member 33. In this instance, as shown in FIG. 7, the position control members 36 are slightly displaced in the clockwise direction but the extent of angular displacement of the position control members 36 is still insufficient to cause engagement of the clutch mechanisms 31. Thus, the output member 33 does not receive the auxiliary torque from the electric motor (FIG. 4). The steering force acting on the input shaft 11 (FIG. 3) is, therefore, transmitted to the output member 33 via the torsion bar 13.

Figure 8:
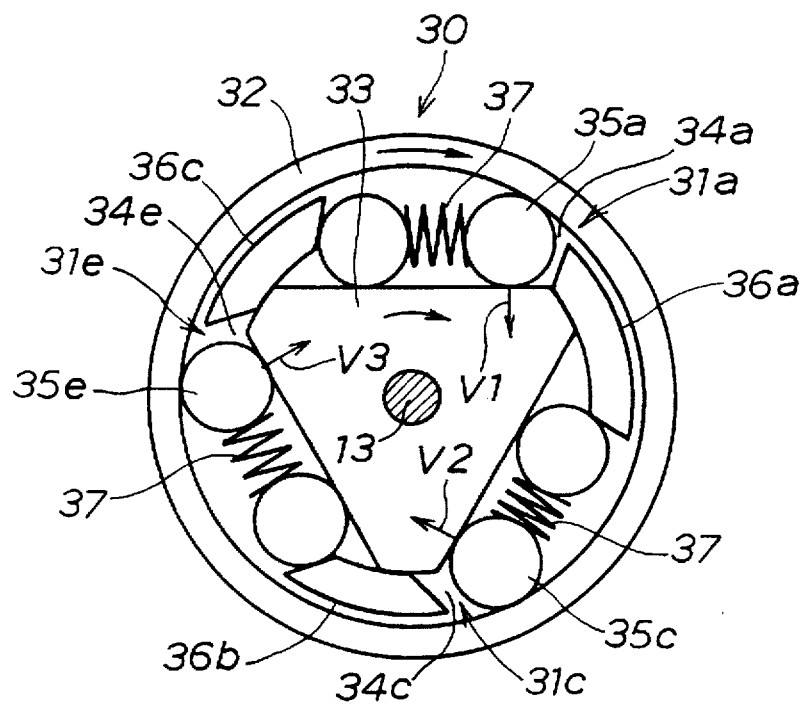
FIG. 8 is a diagrammatical view illustrative of the operation of the mechanical clutch in the first embodiment, the view showing the condition in which the clutch is subjected to a great steering torque.

Alternatively, when the steering wheel (FIG. 1) is steered in the same direction as described above with a great manual effort or force (i.e., the steering torque is large) as experienced when the surface load is large, the relative position or phase between the position control members 36 of the input shaft 11 (FIG. 2) and the output member 33 changes greatly. In this instance, as shown in FIG. 8, the position control members 36 are greatly displaced in the clockwise direction. With this angular movement of the position control members 36, the first, third and fifth locking members 35a, 35c, 35e are displaced via the urging members 37 toward the tapering circumferential ends of the respective tapering spaces 34a, 34c and 34e, so that the input member 32 and the output member 33 are brought into the engaged condition or state via frictional forces acting between the input member 32 and the locking members 35a, 35c, 35e and the locking members 35a, 35c, 35e and the output member 33 (the first, third and fifth clutch mechanisms 31a, 31c, 31e come into the engaged state).

In this instance, since the auxiliary torque input member 32 is angularly moved or turned in the clockwise direction in FIG. 8, the auxiliary torque generated from the electric motor 4 according to the steering torque is transmitted to the output member 33 (steering system) via the first, third and fifth locking members 35a, 35c, 35e. Thus, the output member 33 is driven in the clockwise direction in FIG. 8 by a combined torque which is equal to the sum of the steering torque in the steering system (input shaft 11→torsion bar 13→output shaft 15) shown in FIG. 2 and the auxiliary torque from the electric motor 4.

As described above, in the plural sets of clutch mechanism 31, the tapering spaces 34 have the same shape and are circumferentially spaced at equal intervals. Similarly, the locking members 35 have the same shape and are circumferentially spaced at equal intervals. Accordingly, three vectors V1, V2 and V3 (FIG. 8) acting on the output member 32 have the same magnitude and directed such that they jointly form an equilateral triangle. Thus, in despite of the fact that the first position control member 36a has a different shape from the other position control members 36b and 36c, the sum (resultant vector) of three vectors (V1+V2+V3) acting respectively from the first, third and fifth locking members 35a, 35c and 35e on the output member 33 is equal to zero. This means that the output member 33 is not subjected to an unbalanced load. The mechanical clutch 30 as a whole has a high mechanical strength and a good durability.

In the case where transmission of the auxiliary torque from the electric motor 4 is continuing (i.e., the clutch mechanisms 31 are in the engaged state), a releasing of the engaged clutch mechanisms 31 will take place in a manner described below.

Figure 9:
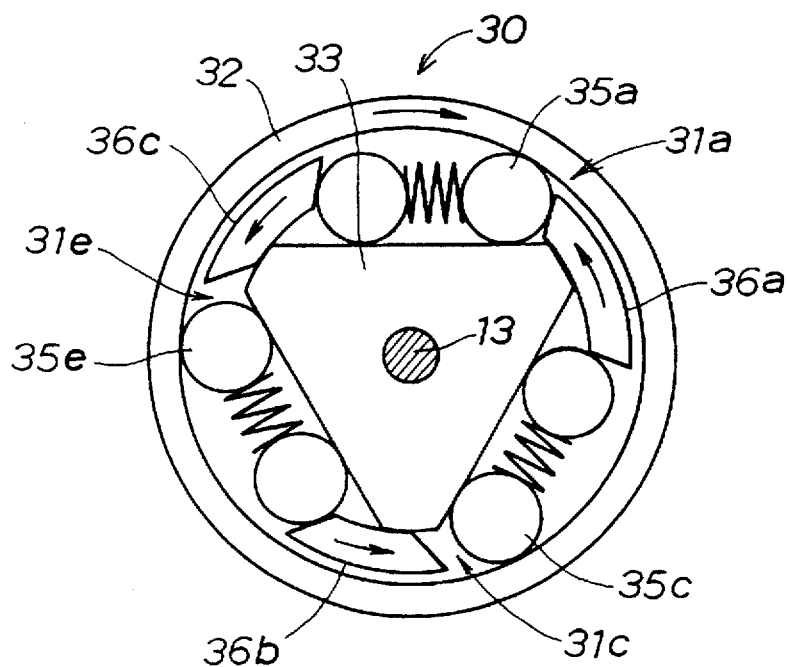
FIG. 9 is a diagrammatical view illustrative of the operation of the mechanical clutch in the first embodiment, the view showing the condition in which position control members start rotating in the counterclockwise direction.
Figure 10:
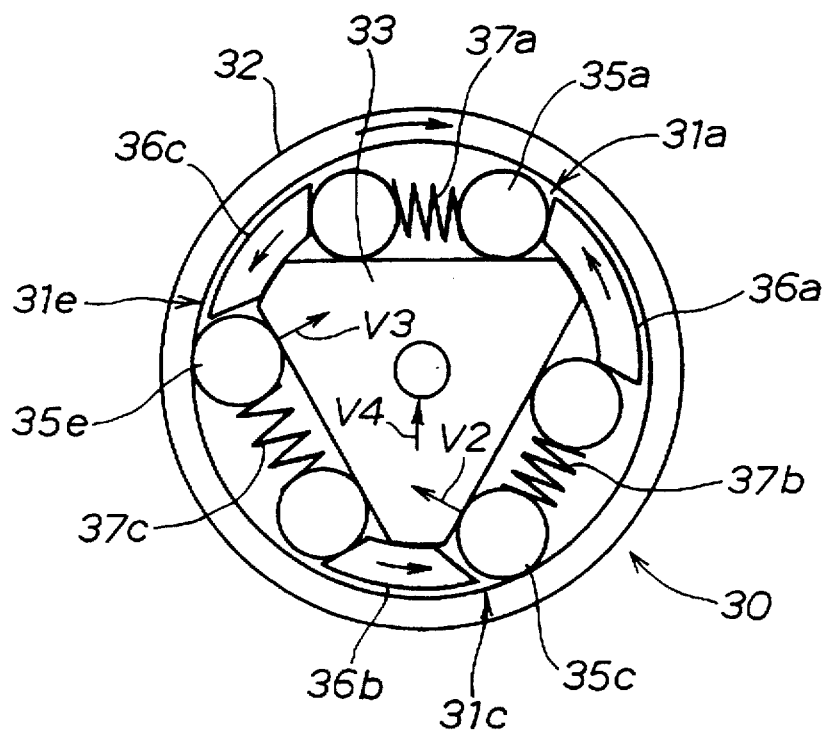
FIG. 10 is a diagrammatical view illustrative of the operation of the mechanical clutch in the first embodiment, the view showing the condition in which the first locking member is released from the lock-up state as a result of counterclockwise rotation of the first position control member.

The steering wheel 2 (FIG. 1) is steered or turned in the opposite direction whereupon, as shown in FIG. 9, the position control members 36a, 36b, 36c turn in the opposite direction (counterclockwise direction in the same figure) from the auxiliary torque input member 32. During that time, the first position control member 36a comes into contact with the first locking member 35a in advance to the engagement between the remaining position control members 36b, 36c and the adjacent locking members 35c, 35e, and subsequently the first position control member 36a forces the first locking member 35a in the counterclockwise direction against the force of the urging member 37 and a frictional force acting between the input member 23 and the output member 33.

Consequently, the first locking member 35a is displaced toward the first urging member 37a whereupon the first clutch mechanism 31a is brought to the disengaged state or condition.

At this point in time, the second and third position control members 36b and 36c are still separated from the third and fifth locking members 35c and 35e, respectively. In this condition, since two vectors V2 and V3 continuously act on the output member 33 from the third and fifth locking members 35c, 35e, the output member 33 is subjected to an unbalanced load (a load directed upwards in FIG. 10) resulting from the sum or resultant vector or force V4 of the two vectors V2, V3. By the effect of this unbalanced load, the output member 33 is slightly displaced upwardly (i.e., in the direction of the resultant force V4) with the result that lock-up forces acting respectively on the third and fifth locking members 35c, 35e are weakened or reduced to such an extent that transmission of the auxiliary torque from the electric motor 4 (FIG. 1) is no longer possible. Thus, the auxiliary torque input member 32 which has engaged in transmitting the auxiliary torque of the electric motor 4 (FIG. 1), now starts slipping or rotating freely. At this point of time, the mechanical clutch 30 is brought to the disengaged state.

Figure 11:
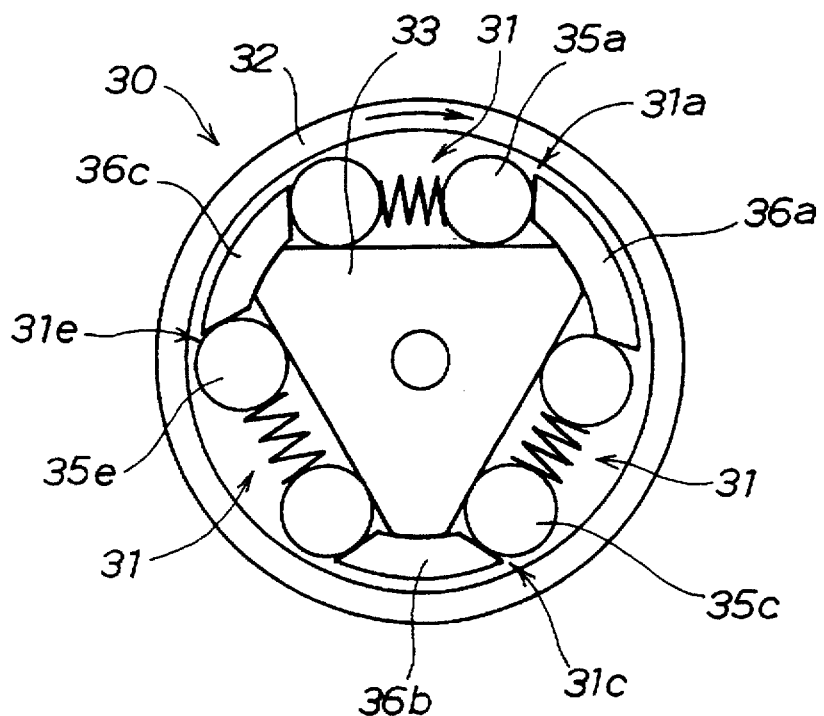
FIG. 11 is a diagrammatical view illustrative of the operation of the mechanical clutch in the first embodiment, the view showing the condition in which the clutch is disengaged when second and third position control members return to their original neutral position.

Immediately thereafter, the second and third position control members 36b, 36c come into contact with the third and fifth locking members 35c, 35e, respectively, and subsequently force them into the original neutral position, as shown in FIG. 11.

In this instance, since the third and fifth locking members 35c, 35e are kept free from friction, a manual effort or force (clutch-disengaging force) required to displace the locking members 35c, 35e by the second and third position control members 36b, 36c can be lowered to a small level just enough to withstand the urging force of the second and third urging members 37b, 37c.

Thus, even though the auxiliary torque input member 32 is continuously rotating, the three sets of clutch mechanisms 31 can be disengaged with sufficient reliability by a small clutch-disengaging force not exceeding the force required to disengage only one set of clutch mechanisms.

In the case where the steering wheel 2 (FIG. 1) is steered in the opposite direction, the mechanical clutch 30 can be brought to the disengaged state or condition in like manner as described above with reference to FIGS. 7 to 11.

Namely, the second, fourth and sixth clutch mechanisms 31b, 31d, 31f, which are engageable in the direction of reverse rotation, are operative in the opposite phase from the first, third and fifth clutch mechanisms 31a, 31c, 31e, respectively. The clutch mechanisms 31b, 31d, 31f can be also selectively engaged and disengaged when the steering wheel 2 is steered in opposite directions.

Figure 12:
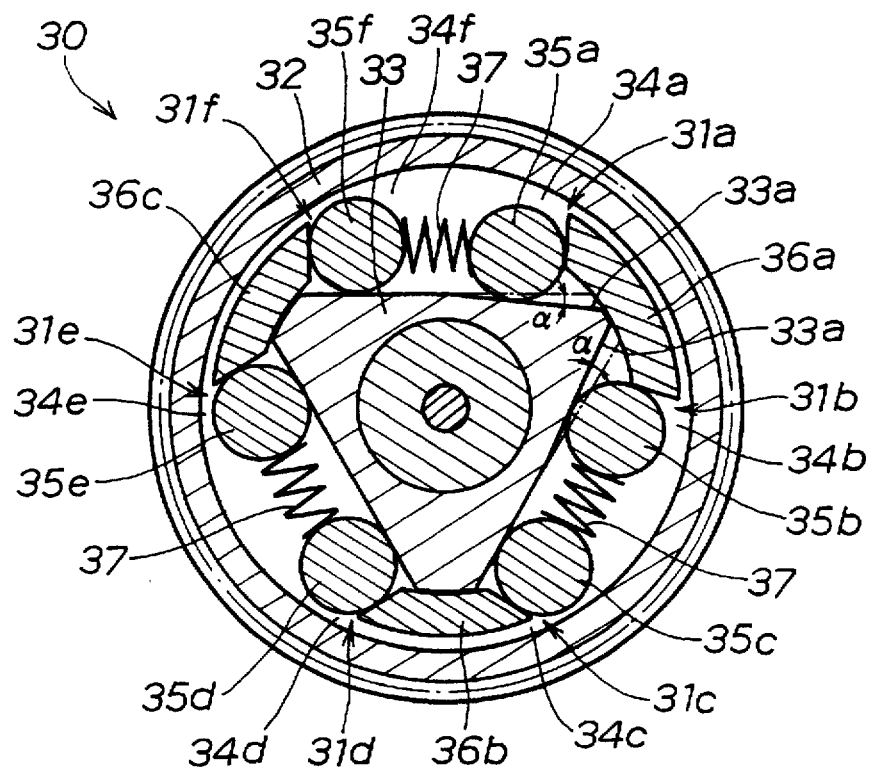
FIG. 12 is a cross-sectional view corresponding to that of FIG. 5, showing an essential part of a mechanical clutch according to a second embodiment.
Figure 13:
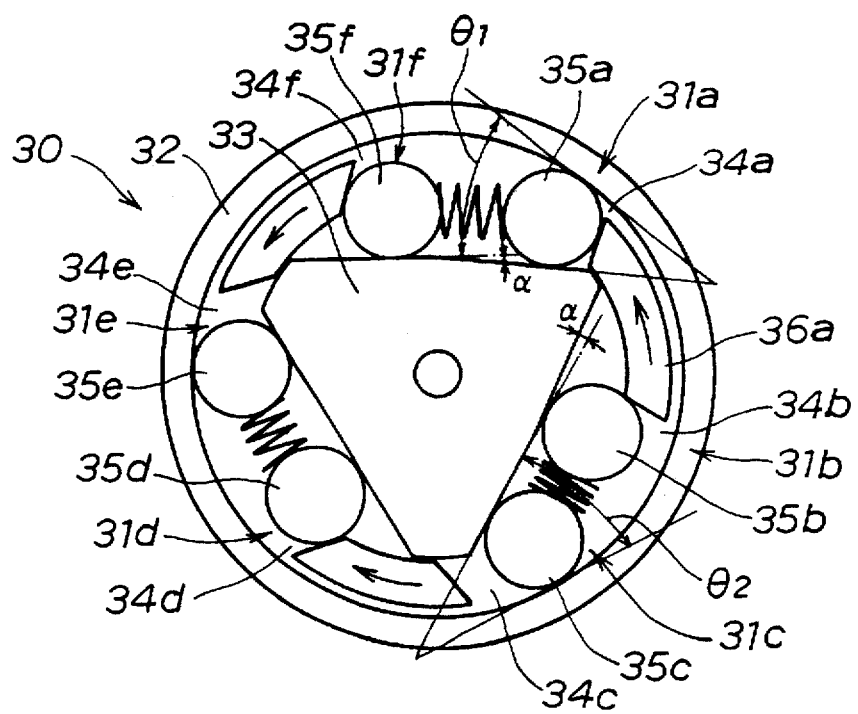
FIG. 13 is a view corresponding to that of FIG. 12, showing the operation of the mechanical clutch.

FIGS. 12 and 13 show a second embodiment of the mechanical clutch 30 according to the present invention. FIG. 12 corresponds to FIG. 5 of the first embodiment previously described. Therefore, the reference characters designating like or corresponding parts are the same as those in FIG. 5 and a further description of these parts can be omitted.

The mechanical clutch 30 in the second embodiment is characterized in that two adjacent sidewalls of a substantially equilateral triangular portion of the output member 33, which are adjacent to and converging toward the first position control member 36a, have beveled surfaces 33a, 33a having an angle of inclination α.

As shown in FIG. 13, by virtue of the beveled surfaces 33a, 33a converging toward the first position control member 36a, the first and second tapering spaces 34a, 34b of the first and second clutch mechanisms 31a, 31b have a taper angle θ₁ which is greater than the taper angle θ2 of the remaining tapering spaces including the third tapering space 34c, for example. Accordingly, a frictional force acting on the first and second locking members 35a, 35b is smaller than that on the remaining locking members 35c, 35d, 35e, 35f, and so the first and second clutch mechanisms 31a, 31b can be held in the engaged state by a relatively small engaging or lock-up force.

Also in the second embodiment, the first and second clutch mechanisms 31a, 31b are disengageable in advance to the remaining clutch mechanisms 31c, 31d, 31e, 31f as the first position control member 36a is longer than the remaining position control members 36b, 36c. In addition, according to the second embodiment, by virtue of the beveled surfaces 33a, 33a and the resulting larger tapering spaces 34a, 34b, the engaged state of the first and second clutch mechanisms 31a, 31b can be released by a smaller clutch-disengaging force than the force required to disengage the remaining clutch mechanisms 31c, 31d, 31e, 31f. Consequently, the mechanical clutch 30 as a whole can be disengaged by a smaller manual effort or force than that of the first embodiment.

In order to disengage the first and second clutch mechanisms 31a, 31b at an advanced timing, a simple arrangement consisting of enlargement of the taper angle of only a part 34a, 34b of the taper spaces 34a–34f is employed. With this simple arrangement, a considerable reduction in clutch-disengaging force can be attained.

The mechanical clutch 30 in the second embodiment can operate efficiently even when all the position control members 36a, 36b, 36c have the same circumferential length, the reason for which is given below.

Owing to the beveled surfaces 33a on the output member 33 and the resulting tapering spaces 34a, 34b having an enlarged taper angle, the first locking member 35a received in the first tapering space 34a is movable to a position close to the tapering circumferential end of the first tapering space 34a. The extent or distance of movement of the first locking member 35a toward the tapering circumferential end of the tapering space 34a is greater than that of the third and fifth locking members 35c, 35e in the third and fifth tapering spaces 34c, 34e. Accordingly, a releasing of the lock-up state of the first locking member 35a caused by angular movement of the first position control member 36a takes place in advance to that of the third and fifth locking members 35c, 35e even though all the position control members 36a, 36b, 36c have the same circumferential length.

Figure 14:
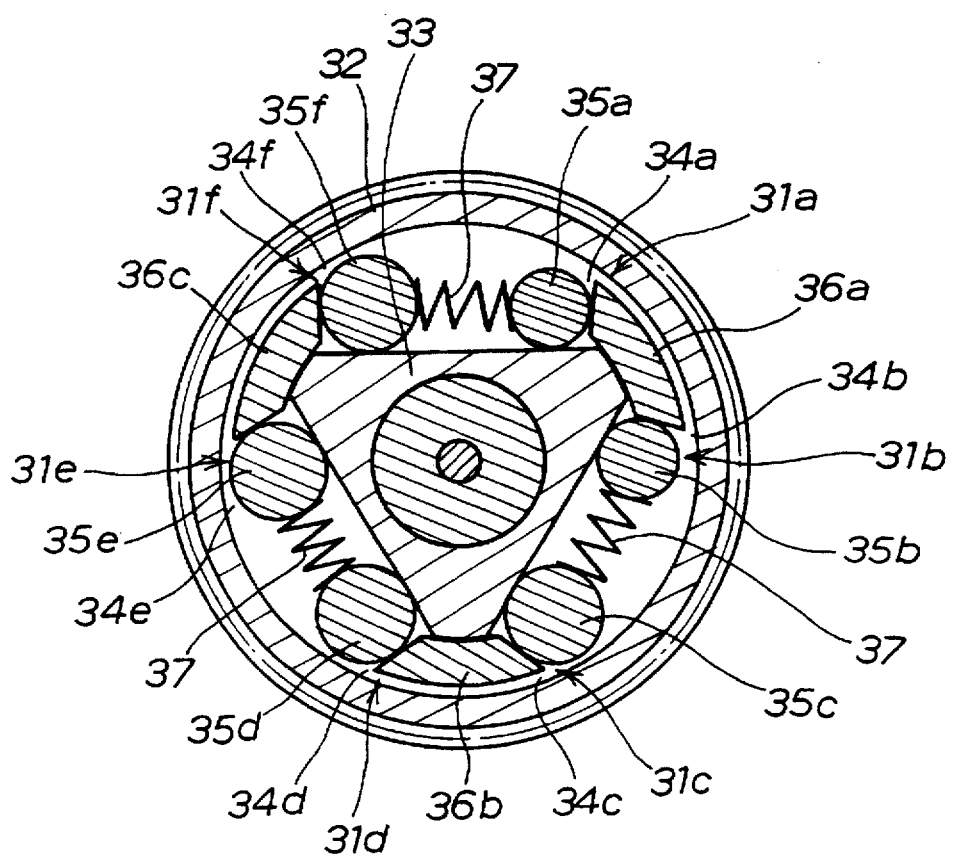
FIG. 14 is a cross-sectional view corresponding to that of FIG. 5, showing an essential part of a mechanical clutch according to a third embodiment.
Figure 15:
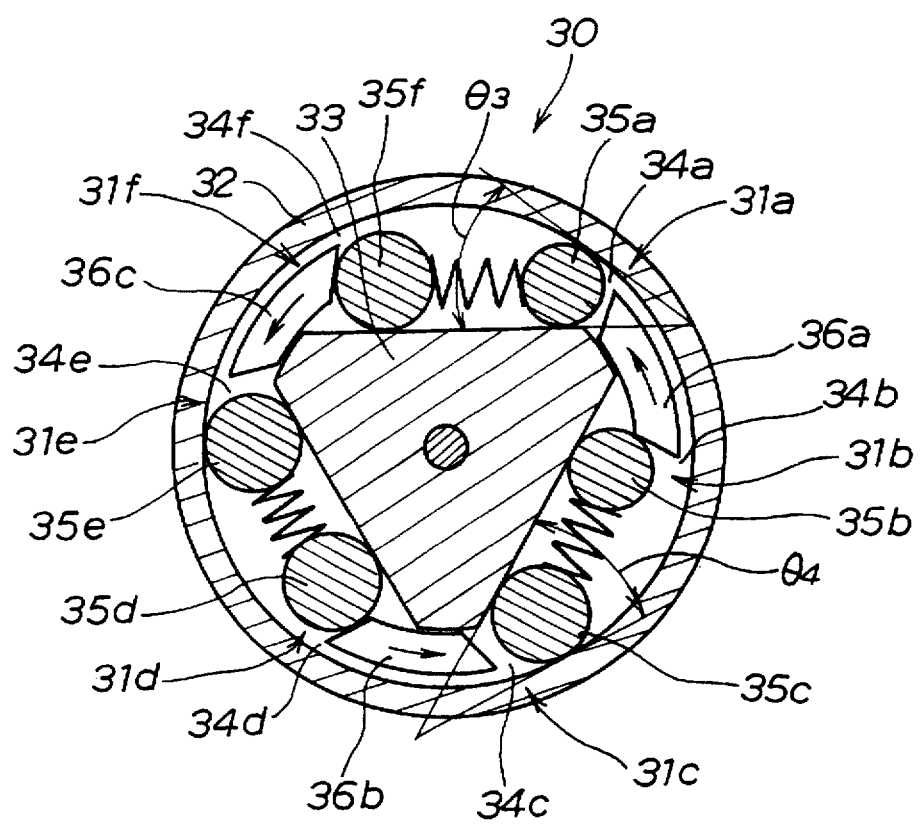
FIG. 15 is a view corresponding to that of FIG. 14, showing the operation of the mechanical clutch.

FIGS. 14 and 15 illustrate a third embodiment of the mechanical clutch 30 according to the present invention. FIG. 14 corresponds to FIG. 5 of the first embodiment previously described. Therefore, the reference characters designating like or corresponding parts are the same as those in FIG. 5 and no further description of these parts is needed.

The mechanical clutch 30 in the third embodiment has a distinguishable feature that the first and second locking members 35a, 35b have a smaller diameter than the remaining locking members 35c, 35d, 35e, 35f, and all the position control menders 36a, 36b, 36c have the same circumferential length.

FIG. 15 shows the first, third and fifth clutch mechanisms 31a, 31c, 31e as they are in the engaged position.

The small-diameter first locking member 35a is movable to a position close to the tapering circumferential end of the first tapering space 34a, the extent or distance of movement of the first locking member 35a toward the tapering circumferential end of the tapering space 34a is greater than that of the third and fifth locking members 35c, 35e in the third and fifth tapering spaces 34c, 34e. Accordingly, when the first position control member 36a comes into contact with the first locking member 35a, the second and third position control members 36b, 36c are still located at positions ahead of the third and fifth locking members 35c, 35e, respectively.

Thus, a releasing of the lock-up state of the first locking member 35a caused by angular movement of the first position control member 36a takes place in advance to that of the third and fifth locking members 35c, 35e even though all the position control members 36a, 36b, 36c have the same circumferential length. After the first clutch mechanism 31a is disengaged, the third and fifth clutch mechanisms 31c, 31e can be disengaged with a small releasing force in the same manner as done in the mechanical clutch of the first embodiment previously described.

According to the mechanical clutch of the third embodiment the engaged state of the mechanical clutch 30 can be readily released by a simple measure consisting of a reduction in diameter of the first locking member 35a.

The second, fourth and sixth clutch mechanisms 31b, 31d, 31f have the same operational relationship as the first, third and fifth clutch mechanisms 31a, 31c, 31e.

Since the small-diameter first and second locking members 35a, 35b are movable to a position close to the tapering circumferential ends of the first and second tapering spaces 34a, 34b, respectively, the first and second tapering spaces 34a, 34b, as they are in the engaged state, have a taper angle $\theta_3$ greater than the taper angle $\theta_4$ of the remaining taper spaces including the third tapering space 34c, for example. Accordingly, the first and second locking members 35a, 35b are subjected to a smaller frictional force than the remaining locking members 35c, 35d, 35e, 35f.

According to the mechanical clutch 30 of the third embodiment, the first and second clutch mechanisms 31a, 31b can be brought from the engaged state to the disengaged state at an advanced timing and with a smaller clutch-disengaging force than as required for the disengagement of the remaining clutch mechanisms 31c, 31d, 31e, 31f. The mechanical clutch 30 as a whole can, therefore, be disengaged by a small clutch-disengaging force.

The aforesaid advanced clutch releasing timing of the first and second clutch mechanisms can be achieved by reducing the clutch-disengaging force by means of a simple arrangement consisting of a reduction in diameter of a part 35a, 35b of the locking members 35a–35f.

The mechanical clutch of the third embodiment may be modified such that the circumferential length of the first position control member 36a is greater than the length of The remaining position control members 36b, 36c in the same manner as done in the first embodiment.

Figure 16:
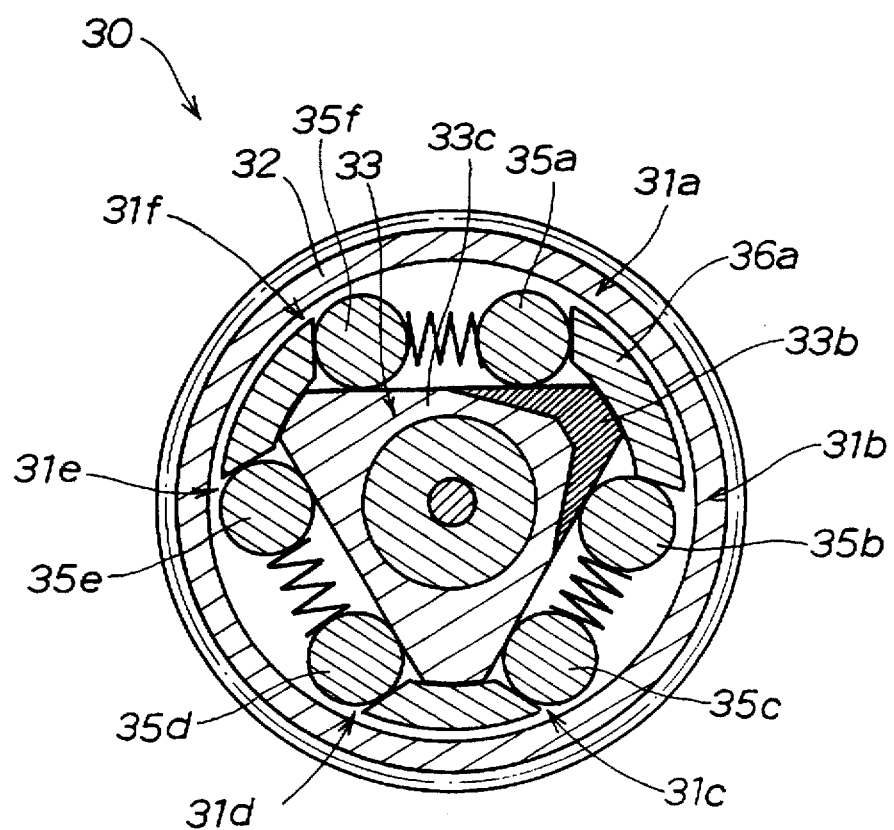
FIG. 16 is a cross-sectional view corresponding to that of FIG. 5, showing an essential part of a mechanical clutch according to a fourth embodiment.

FIG. 16 shows a fourth embodiment of the mechanical clutch 30 according to the present invention. FIG. 16 corresponds to FIG. 5 of the first embodiment previously described. Therefore, the reference characters designating like or corresponding parts are the same as those in FIG. 5 and a further description of these parts can be omitted.

The mechanical clutch 30 in the fourth embodiment is characterized in that two adjacent sidewalls of a substantially equilateral triangular portion of the output member 33 have respective surfaces (contact surfaces) held in contact with the first and second locking members 35a, 35b, respectively, the contact surfaces having a smaller frictional resistance than these surfaces on the output member 33 which are held in contact with the remaining locking members 35c, 35d, 35e, 35f. In the illustrated embodiment, the output member 33 is a composite member including a low frictional resistance portion with 33b made of copper and integrally formed with a major portion or body 33c made of steel, the low frictional resistance portion 33b having the aforesaid low frictional resistance contact surfaces held in contact with the first and second locking members 35a, 35b.

According to the mechanical clutch 30 of the fourth embodiment, by virtue of the low frictional resistance portion 33b, a frictional force acting between the first and second locking members 35a, 35b and the output member 33 is small and, hence, the first and second locking members 35a, 35b can be readily brought to the disengaged state.

In the fourth embodiment, the first and second clutch mechanisms 31a, 31b adapted to be disengaged at an advanced timing are so constructed as to facilitate a smooth releasing of the lock-up state of the first and second locking members 35a, 35b. To this end, the first and second locking members 35a, 35b may have an outside surface (peripheral surface of a cylindrical roller) which is smaller in coefficient of friction (frictional resistance) than the remaining locking members 35c, 35d, 35e, 35f.

Figure 17:
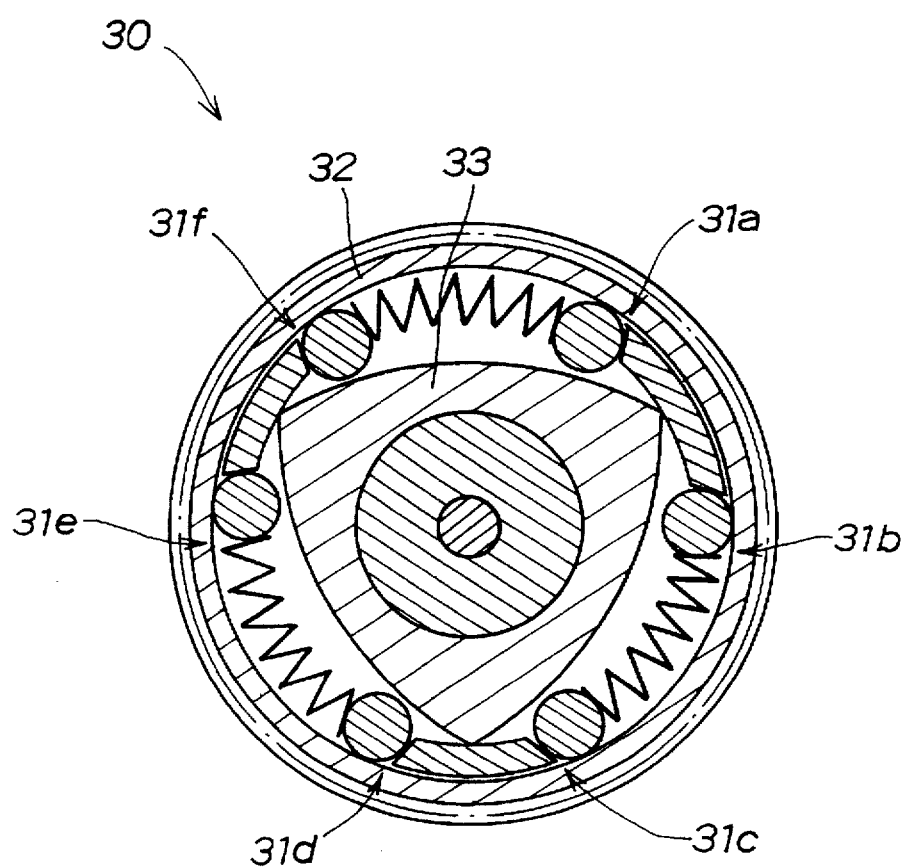
FIG. 17 is a cross-sectional view corresponding to that of FIG. 5, showing an essential part of a mechanical clutch according to a fifth embodiment.
Figure 18:
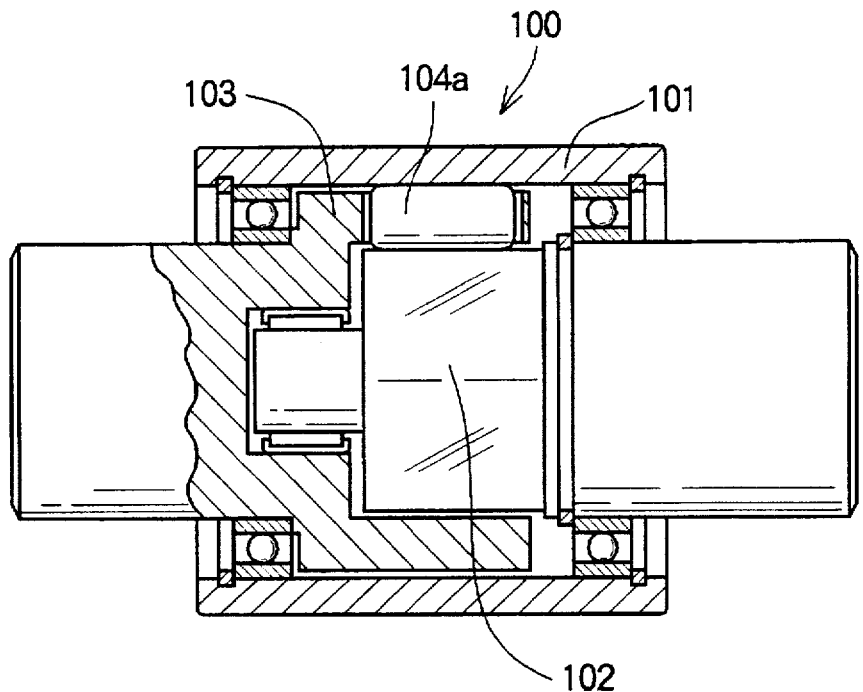
FIG. 18 is a cross-sectional view showing a conventional clutch device.
Figure 19:
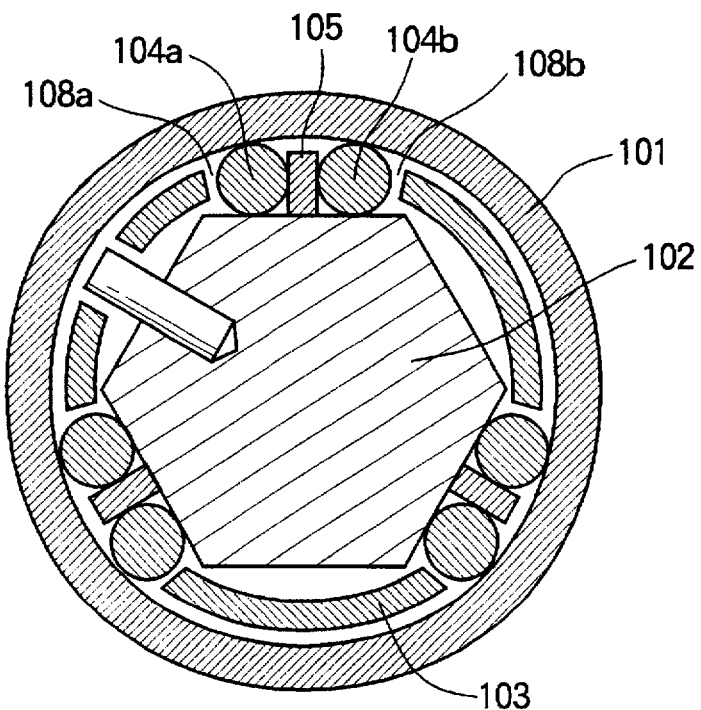
FIG. 19 is a cross-sectional view taken along line B—B of FIG. 18.

FIG. 17 illustrates a fifth embodiment of the mechanical clutch 30 according to the present invention. FIG. 17 corresponds to FIG. 5 of the first embodiment previously described. Therefore, the reference characters designating like or corresponding parts are the same as those in FIG. 5 and no further description of these parts is needed.

The mechanical clutch 30 in the fifth embodiment has a distinguishable feature that the output member 33 has a substantially equilateral triangular cross section, and three sides of the equilateral triangle, which form side-walls of the output member 33, are rounded or arcuate.

By virtue of the rounded sidewalls of the output member 33, highly smooth operation of the clutch mechanisms 31a, 31b, 31c, 31d, 31e, 31f can be attained.

In the first to fifth embodiments of the present invention described above, a mechanical clutch 30 includes a plurality of sets of clutch mechanisms 31, at least one set of which is disengageable in advance to the remaining set of clutch mechanisms. Although the number of the clutch mechanism sets in the illustrated embodiments is three, four or more clutch mechanism sets can be employed.

The locking members 35a, 35b, 35c, 35d, 35e, 35f may be spherical other than cylindrical provided that they are selectively engageable and disengageable with the tapering circumferential ends of the mating tapering spaces 34a, 34b, 34c, 34d, 34e, 34f to engage and disengage the input member 32 and the output member 33.

The arrangements of the first, second, third, fourth and fifth embodiments can be combined at random. For instance, the arrangement of the fourth embodiment shown in FIG. 16 or the arrangement of the fifth embodiment shown in FIG. 17 can be combined with the arrangement of any one of the remaining embodiments.

Obviously, various minor changes and modifications of the present invention are possible in the light of the above teaching. It is therefore to be understood that within the scope of the appended claims the invention may be practiced otherwise than as specifically described.

What is claimed is:

1. An electric power steering apparatus including an electric motor for generating an auxiliary torque according to a steering torque, and a plurality of sets of friction clutch mechanisms for transmitting the auxiliary torque to a steering system, said plurality of sets of friction clutch mechanisms comprising:

an input member;

an output member;

a plurality of tapering spaces defined between said input member and said output member;

a plurality of locking members movably disposed in said tapering spaces, respectively, for selectively engaging and disengaging said input and output members;

a plurality of position control members for positioning said locking members; and a plurality of urging members urging said locking members against the adjacent position control members, wherein the clutch mechanisms of at least one of said plurality of sets of clutch mechanisms are brought to a disengaged state in advance to the clutch mechanisms of the remaining set of clutch mechanisms.

2. An electric power steering apparatus according to claim 1 wherein said position control members are disposed on the same circle and circumferentially spaced from one another, one of said position control members associated with said at least one set of clutch mechanisms has a longer circumferential length than the remaining position control member.

3. An electric power steering apparatus according to claim 1, wherein said at least one set of clutch mechanisms is disengageable by a smaller clutch-disengaging force than that required to disengage the remaining set of clutch mechanisms.

4. An electric power steering apparatus according to claim 1, wherein the tapering spaces associated with said at least one set of clutch mechanisms have a greater taper angle than, the tapering spaces of the remaining set of clutch mechanisms.

5. An electric power steering apparatus according to claim 1, wherein the locking members of said at least one set of clutch mechanisms have a smaller diameter than the locking members of the remaining set of clutch mechanisms.

6. An electric power steering apparatus according to claim 1, wherein the locking members of said at least one set of clutch mechanisms have respective contact surfaces having a smaller frictional resistance than contact surfaces of the respective locking members of the remaining set of clutch mechanisms.

7. An electric power steering apparatus according to claim 1 wherein said at least one set of clutch mechanisms has a pair of contact surfaces engageable with the mating locking members and having a smaller frictional resistance than contact surfaces engageable with the respective locking members of the remaining set of clutch mechanisms.

8. An electric power steering apparatus according to claim 1, wherein the locking members of said at least one set of clutch mechanisms have a smaller diameter than the locking member of the remaining set of clutch mechanisms, and wherein said tapering spaces and said position control members each have the same shape.

9. An electric power steering apparatus according to claim 1, wherein the tapering spaces of said at least one set of clutch mechanisms have a greater taper angle than the tapering spaces of the remaining set of clutch mechanisms, and wherein said locking members and said position control members each have the same shape.

10. An electric power steering apparatus according to claim 1, wherein at least one of said position control members have a different shape than the remaining position control member, and wherein said tapering spaces have the same shape and disposed at regular intervals, and said locking members have the same shape and disposed at regular intervals.

* * * * *